(12) United States Patent
Hemphill et al.

(10) Patent No.: US 11,046,053 B2
(45) Date of Patent: Jun. 29, 2021

(54) COMPOSITE GYPSUM BOARD AND RELATED METHODS

(71) Applicant: United States Gypsum Company, Chicago, IL (US)

(72) Inventors: Mark Hemphill, Hawthorn Woods, IL (US); Yijun Sang, Oak Park, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 16/581,070

(22) Filed: Sep. 24, 2019

(65) Prior Publication Data
US 2020/0262180 A1 Aug. 20, 2020

Related U.S. Application Data

(60) Provisional application No. 62/806,102, filed on Feb. 15, 2019.

(51) Int. Cl.
*B32B 13/08* (2006.01)
*B32B 7/02* (2019.01)
(Continued)

(52) U.S. Cl.
CPC ............... *B32B 13/08* (2013.01); *B32B 7/02* (2013.01); *C04B 28/147* (2013.01); *E04B 2/723* (2013.01);
(Continued)

(58) Field of Classification Search
CPC ............ C04B 20/1022; C04B 22/0086; C04B 28/147; C04B 22/143; C04B 22/16;
(Continued)

(56) References Cited

U.S. PATENT DOCUMENTS

| 2,017,022 A | 10/1935 | Roos |
| 2,080,009 A | 5/1937 | Roos |

(Continued)

FOREIGN PATENT DOCUMENTS

WO WO 2019/213045 A1 11/2019

OTHER PUBLICATIONS

Burrows, "A Decade's Experience of Gypsum Board Weight Reduction in the U.S.," 14. *Internationale Baustofftagung* 1.0197-1.0207 (Weimar, Sep. 20-23, 2000).

(Continued)

*Primary Examiner* — Lawrence D Ferguson
(74) *Attorney, Agent, or Firm* — Leydig, Voit & Mayer, Ltd.; Philip T. Petti; Pradip K. Sahu

(57) ABSTRACT

Disclosed is a composite gypsum board comprising a board core comprising set gypsum sandwiched between face and back cover sheets. The composite gypsum board also comprises an intermediate sheet between the board core and the face cover sheet, with a thin, dense gypsum layer disposed between the intermediate sheet and the face cover sheet. Optionally, a second dense gypsum layer can be disposed between a first major side of the board core and the back cover sheet. Also disclosed is a method of preparing a composite gypsum board in which an intermediate sheet is applied over a dense gypsum layer disposed on a face cover sheet. A back cover sheet is applied to the other major side of the board core, with a second dense gypsum layer optionally disposed therebetween.

23 Claims, 2 Drawing Sheets

(51) Int. Cl.
*C04B 28/14* (2006.01)
*E04B 2/72* (2006.01)
*E04C 2/26* (2006.01)
*C04B 111/00* (2006.01)

(52) U.S. Cl.
CPC ............ *E04C 2/26* (2013.01); *B32B 2250/05* (2013.01); *B32B 2307/54* (2013.01); *B32B 2307/718* (2013.01); *B32B 2307/72* (2013.01); *B32B 2419/00* (2013.01); *C04B 2111/0062* (2013.01)

(58) Field of Classification Search
CPC ..... C04B 24/123; C04B 24/226; C04B 24/38; C04B 38/10; C04B 2103/10; C04B 2111/0062; C04B 2111/00629; B32B 13/045; B32B 13/08; B32B 2250/04; B32B 2250/05; B32B 2250/44; B32B 2266/049; B32B 2307/54; B32B 2307/718; B32B 2307/72; B32B 2419/00; B32B 2607/00; B32B 29/007; B32B 3/04; B32B 5/20; B32B 7/02; E04B 2/723; E04C 2/043; E04C 2/26
See application file for complete search history.

(56) References Cited

U.S. PATENT DOCUMENTS

| | | |
|---|---|---|
| 4,518,652 A | 5/1985 | Willoughby |
| 5,643,510 A | 7/1997 | Sucech |
| 5,683,635 A | 11/1997 | Sucech et al. |
| 6,342,284 B1 | 1/2002 | Yu et al. |
| 6,494,609 B1 | 12/2002 | Wittbold et al. |
| 6,632,550 B1 | 10/2003 | Yu et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,364,676 B2 | 4/2008 | Sucech et al. |
| 8,197,952 B2 | 6/2012 | Yu et al. |
| 8,500,904 B2 | 8/2013 | Yu et al. |
| 10,421,251 B2 | 9/2019 | Li et al. |
| 2007/0048490 A1 | 3/2007 | Yu et al. |
| 2008/0090068 A1 | 4/2008 | Yu |
| 2010/0247937 A1 | 9/2010 | Liu et al. |
| 2012/0168527 A1 | 7/2012 | Li et al. |
| 2012/0170403 A1 | 7/2012 | Li et al. |
| 2016/0375651 A1 | 12/2016 | Li et al. |
| 2016/0375655 A1 | 12/2016 | Li et al. |
| 2016/0375656 A1 | 12/2016 | Li et al. |
| 2016/0376191 A1 | 12/2016 | Li et al. |
| 2017/0030076 A1 | 2/2017 | Li et al. |
| 2017/0096366 A1 | 4/2017 | Vilinska et al. |
| 2017/0096369 A1 | 4/2017 | Vilinska et al. |
| 2017/0152177 A1 | 6/2017 | Vilinska et al. |
| 2017/0362124 A1 | 12/2017 | Sang et al. |
| 2019/0093354 A1 | 3/2019 | Dimitrakopoulos et al. |

OTHER PUBLICATIONS

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

European Patent Office, International Search Report and the Written Opinion in International Application No. PCT/US2020/017631 (dated Jun. 5, 2020).

COMPOSITE GYPSUM BOARD AND RELATED METHODS

CROSS-REFERENCE TO RELATED APPLICATION

This patent application claims the benefit of priority to U.S. Provisional Patent Application No. 62/806,102, filed on Feb. 15, 2019, and entitled, "Composite Gypsum Board and Related Methods," which is incorporated in its entirety herein by this reference.

BACKGROUND OF THE INVENTION

Set gypsum is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

Gypsum (calcium sulfate dihydrate) is naturally occurring and can be mined in rock form. It can also be in synthetic form (referred to as "syngyp" in the art) as a by-product of industrial processes such as flue gas desulfurization. From either source (natural or synthetic), gypsum can be calcined at high temperature to form stucco (i.e., calcined gypsum in the form of calcium sulfate hemihydrate and/or calcium sulfate anhydrite) and then rehydrated to form set gypsum in a desired shape (e.g., as a board). During manufacture of the board, the stucco, water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

Reducing the density of the board is of significant interest as long as sufficient strength is maintained. To reduce weight, mass can be removed from the volume of the board and replaced with, e.g., voids, such as air voids created from foam as well as water voids caused by evaporation of water in excess of the amount needed for the rehydration of stucco to gypsum. Perlite and other lightweight filler can also be used as an alternative or supplement to the air and water voids. Lower weight board is easier to handle, transport, and install, allowing for desired efficiencies in the installation of the board. While lighter weight board is desired, it should not be at the expense of achieving board strength desired by consumers. As mass is removed from the board, it is a challenge to maintain sufficient strength and integrity in the board.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The present disclosure provides a composite gypsum board having a set gypsum core disposed between two cover sheets (i.e., face (Manila) and back (Newsline) cover sheets), with the composite board also including an intermediate sheet disposed between the core and the face cover sheet. In this regard, the composite board contains a relatively thin gypsum layer that is generally denser and preferably stiffer than the board core. The intermediate sheet is disposed between the board core and the dense gypsum layer. In preferred embodiments, the combination of the intermediate sheet and the dense gypsum layer imparts strength to the composite board, e.g., as seen in good nail pull resistance (sometimes referred to simply as "nail pull").

Advantageously, the presence of the intermediate sheet surprisingly and unexpectedly allows for board with enhanced strength (e.g., in the form of nail pull resistance or other strength metrics), which is particularly useful for lower weight board as is increasingly desired in the wallboard market by consumers and building contractors. While not wishing to be bound by any particular theory, it is believed that the intermediate sheet synergistically enhances the ability of the dense gypsum layer to withstand force (load) such that it has better structural integrity and strength. Thus, board can be prepared with good strength at lower weights.

In addition, manufacturing cost can be reduced and enhanced efficiency can be achieved as the use of the intermediate sheet allows for the use of cover sheets with lower basis weights in some embodiments. If desired, the amount of some additives known to be included in the stucco slurry, including strength additives such as pregelatinized starch, uncooked starch, polyphosphate, dispersant etc., can be reduced, minimized, or even eliminated in these or alternative embodiments. Thus, some preferred embodiments of the invention can allow for both reduction in board weight and production cost (e.g., via lower basis weights for the cover sheets and/or with the use of less strength additive chemistry in the board core) while maintaining the desired board strength.

Another advantage provided by some preferred embodiments of the invention is that washout, and hence waste, of the dense layer, can be reduced or eliminated thereby allowing for further manufacturing efficiencies. In this regard, normally board is prepared upside down initially at the wet end of a wallboard machine (i.e., wallboard manufacturing line). Paper is unwound and released onto a moving conveyor. The dense layer is conventionally applied to the paper upstream of the main stucco slurry mixer (e.g., a pin or pinless mixer). Conventionally, one problem is that the core slurry being released from the main mixer via a boot or similar component has considerable velocity, particularly in a modern high speed plant (e.g., operating at a rate of at least about 500 feet per minute). As the high velocity core slurry is applied over the slurry for the dense gypsum layer disposed on the paper, the dense gypsum layer slurry can experience some degree of washout, thereby leading to waste and diminishment of the dense gypsum layer and its attendant advantages. Advantageously, it has been found that applying the intermediate sheet between the slurry for the dense gypsum layer and the slurry for the board core protects the dense gypsum layer such that wash out can be reduced. In this regard, the board machine can be configured to allow for the intermediate sheet to be released (e.g., unwound) upstream of the main mixer and then applied over the dense gypsum layer. For example, in one embodiment, the intermediate sheet can be unwound from a roll, directed under the main mixer and applied just downstream of the mixer, with the board core slurry then applied immediately over the intermediate sheet.

Thus, in one aspect, the invention provides a composite gypsum board comprising a board core between face and back cover sheets. The board core comprises set gypsum formed from at least water, stucco and other ingredients as desired (e.g., starches, dispersants, polyphosphates, retarders, accelerators, fire resistance additives, etc.), the core defining first and second core faces. The composite gypsum board also has an intermediate sheet having first and second faces, with the first face of the intermediate sheet facing the first core face. The composite gypsum board also comprises a dense gypsum layer having first and second faces, the first face of the dense gypsum layer facing the second face of the intermediate sheet. The face cover sheet has first and second faces, the first face of the face cover sheet facing the second face of the dense gypsum layer. The back cover sheet has first and second faces, the first face of the back cover sheet facing the second face of the board core. The second faces of the face and back cover sheets, respectively, are typically the outer surfaces of the composite gypsum board. Optionally, a second dense layer can be provided between the back cover sheet and the board core.

In another aspect, the invention provides a method of making composite gypsum board having a board core sandwiched between face and back cover sheets. The method comprises preparing a first slurry comprising at least stucco and water. The first slurry is used to form a dense gypsum layer, and a first face of the dense gypsum layer is applied in a bonding relation to a first face of the face cover sheet. An intermediate sheet is applied to the second face of the dense gypsum layer. Water, stucco, foaming agent, and other ingredients as desired (e.g., starches, dispersants, polyphosphates, retarders, accelerators, fire resistance additives, etc.) are mixed to form a second slurry used to form the board core comprising set gypsum. The second slurry forms the board core having first and second faces, with the first face of the board core applied to the second face of the intermediate sheet. The back paper has first and second faces, with the first face of the back paper facing the second face of the board core. The second faces of the face and back cover sheets, respectively, are typically the outer surfaces of the composite gypsum board. Optionally, a second dense layer can be provided between the back cover sheet and the board core.

BRIEF DESCRIPTION OF THE SEVERAL VIEWS OF THE DRAWING(S)

DETAILED DESCRIPTION OF THE INVENTION

Embodiments of the invention provide a composite gypsum board and method of making the composite gypsum board. The composite board contains a set gypsum core sandwiched between face and back cover sheets, along with an intermediate sheet between the core and the face paper. A relatively thin dense gypsum layer is disposed between a first major side of the board core and the face paper. If desired, a second relatively thin dense gypsum layer can be disposed between the other major side of the board core and the back cover sheet.

Surprisingly and unexpectedly, preferred embodiments of the disclosure provide for a composite gypsum board with enhanced strength and can allow for reduction or elimination in the use of certain additives in the gypsum slurries used in forming gypsum layers in the board. For example, in some preferred embodiments, the composite gypsum board allows for reduction in, or elimination of, the usage of strength enhancing additives such as starch (including uncooked or pregelatinized starches), polyphosphate such as sodium trimetaphosphate ("STMP"), dispersant, etc. For example, in forming the gypsum slurry (sometimes referred to as "stucco slurry") the amount of strength-enhancing starch (e.g., pregelatinized or uncooked starch) can be reduced to an amount of from about 0% to about 4%, such as from about 0% to about 2%, or 0% to about 0.5%; the amount of polyphosphate (e.g., sodium trimetaphosphate or STMP) can be reduced to an amount of from about 0.05% to about 0.4%, such as from about 0.05% to about 0.2%; and the amount of dispersant (e.g., naphthalene sulfonate) can be reduced to an amount of from about 0.1% to about 0.8%, such as from about 0.1% to about 0.5% (wherein all of the preceding weights are by weight of the stucco). Alternatively, or in addition, preferred composite gypsum boards in accordance with the invention can also allow for the usage of lower basis weight cover sheets. The reduction in the use of such additives and the facilitation of lower basis weight cover sheets allows for a significant reduction of raw material costs in manufacturing board, e.g., at commercial or laboratory scale.

Without wishing to be bound by any particular theory, it is believed that the combination of the tensile strength from the intermediate sheet and the stiffness from the dense gypsum layer allows for strength enhancement of the composite gypsum board, as evidenced by, for example, nail pull resistance. In this regard the presence of the face cover sheet with prior art "skim coats" have not been sufficient in enhancing strength and reducing board weights. The use of the intermediate sheet as described herein with the dense gypsum layer has thus provided an improvement over these conventional boards.

Figure 1A:
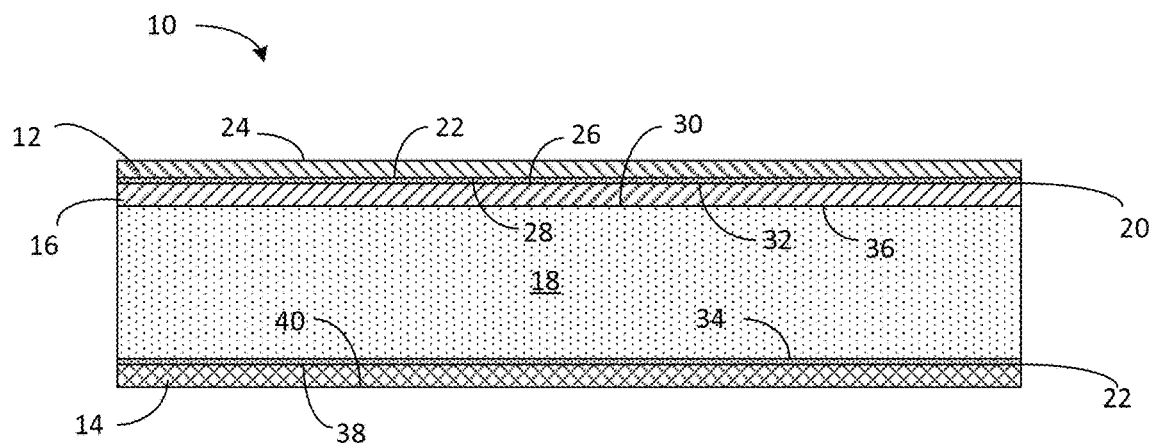
FIG. 1A is a schematic illustration (not drawn to scale) of a cross-section of a wallboard with two dense layers in accordance with embodiments of the invention.
Figure 1B:
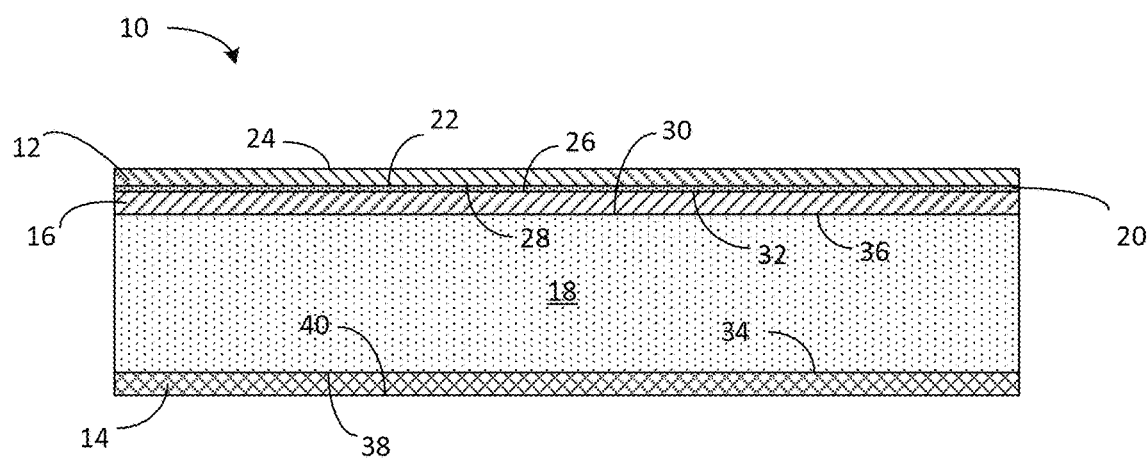
FIG. 1B is a schematic illustration (not drawn to scale) of a cross-section of a wallboard with one dense layer in accordance with embodiments of the invention.

To illustrate, FIGS. 1A and 1B schematically depict two embodiments of the invention where a composite gypsum board 10 is shown. The board 10 comprises a face cover sheet 12, a back cover sheet 14, and an intermediate sheet 16, which is disposed between a board core 18 and a dense gypsum layer 20. FIG. 1A illustrates the presence of a second dense gypsum layer 22, while FIG. 1B depicts a composite gypsum board absent the optional second dense gypsum layer. Any suitable thickness for each component can be used. For example, in some embodiments, one or more type of paper (face, back, and/or intermediate) has a thickness of from about 0.008 inch to about 0.013 inch (e.g., about 0.01 inch), and the dense layer has a thickness of from about 0.01 inch to about 0.1 inch.

As seen in FIGS. 1A and 1B the face cover sheet 12 has a first face 22 and a second face 24, which is generally the outer face surface of the board that is normally the surface visible when the board 10 is installed. The dense gypsum layer 20 has a first face 26 and a second face 28 that faces the first face 22 of the face cover sheet 12. The intermediate sheet 16 has first and second faces 30 and 32. The second face 32 of the intermediate sheet 16 faces the first face 26 of the dense gypsum layer 20. The board core 18 has a first face 34 and a second face 36, which faces the first face 30 of the intermediate sheet 16. The back cover sheet 14 has first and second faces 38 and 40. The first face 34 of the board core 18 faces the first face 38 of the back cover sheet 14, while the second face 40 of the back cover sheet 14 is normally the outer surface of the board 10, inwardly facing studs, joists or the like when installed. As shown in FIG. 1A, the second dense layer 22 can optionally be provided between the back cover sheet 14 and board core 18.

Figure 1C:
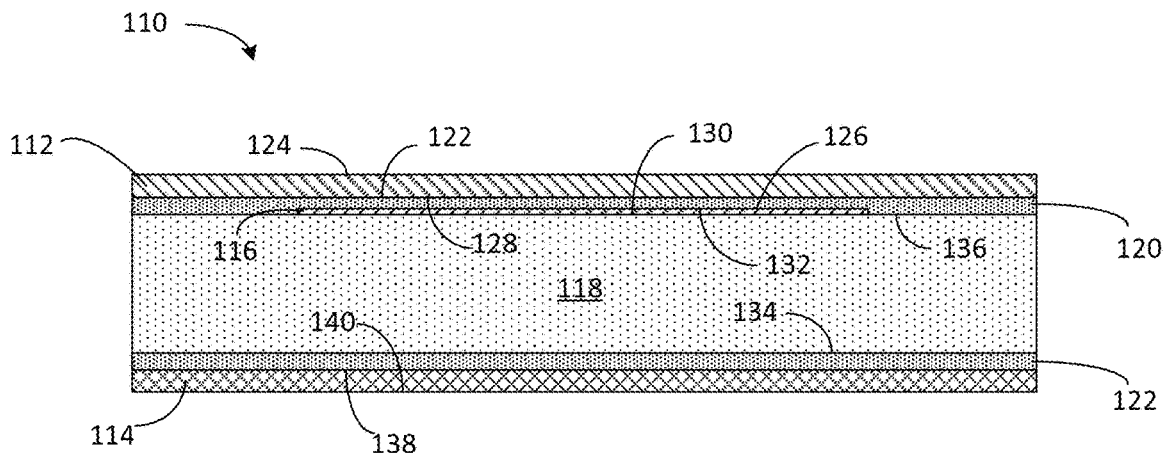
FIG. 1C is a schematic illustration (not drawn to scale) of a cross-section of a wallboard with an intermediate sheet with relatively narrower width in accordance with embodiments of the invention.

The intermediate sheet can have any suitable width. In some embodiments, the intermediate sheet has a width corresponding approximately with the width of the board. However, in order to reduce manufacturing expense, the intermediate sheet can have a smaller width than the width of the board in some embodiments. To illustrate, FIG. 1C schematically depicts an embodiment of the invention where a composite gypsum board 110 is shown when the intermediate sheet 116 has a considerably smaller width than that of the board. As schematically depicted for a nominal 48 inch wide board, the intermediate sheet can have a width of, e.g. 26 inches to 36 inches, with the center of the intermediate sheet targeted over the center of the width of the board. The board 110 comprises a face cover sheet 112, a back cover sheet 114, and the intermediate sheet 116, which is disposed between a board core 118 and a dense gypsum layer 120. FIG. 1C illustrates the presence of an optional second dense gypsum layer 122, although it will be understood that the second dense layer 122 is not required as shown in FIG. 1B.

As seen in FIG. 1C, the face cover sheet 112 has a first face 122 and a second face 124, which is generally the outer face surface of the board that is normally the surface visible when the board 110 is installed. The dense gypsum layer 120 has a first face 126 and a second face 128 that faces the first face 122 of the face cover sheet 112. The intermediate sheet 116 has first and second faces 130 and 132. The second face 132 of the intermediate sheet 116 faces the first face 126 of the dense gypsum layer 120. The board core 118 has a first face 134 and a second face 136, which faces the first face 130 of the intermediate sheet 116. The back cover sheet 114 has first and second faces 138 and 140. The first face 134 of the board core 118 faces the first face 138 of the back cover sheet 114, while the second face 140 of the back cover sheet 114 is normally the outer surface of the board 110, inwardly facing studs, joists or the like when installed. As shown in FIG. 1C, the second dense layer 122 can optionally be provided between the back cover sheet 114 and board core 118.

The thin, dense gypsum layer generally has a higher density than the board core has. For example, in some embodiments, the dense gypsum layer has a dry density of from about 35 pcf to about 60 pcf, such as from about 40 pcf to about 60 pcf, from about 45 pcf to about 60 pcf, from about 50 pcf to about 60 pcf, from about 35 pcf to about 50 pcf, from about 35 pcf to about 45 pcf, from about 45 pcf to about 60 pcf, or from about 45 pcf to about 55 pcf. In some embodiments, the thin, dense gypsum layer is considerably smaller than the thickness of the board core. For example, in some embodiments, the dense gypsum layer has a thickness of from about 0.01 inch to about 0.1 inch, e.g., from about 0.03 inch to about 0.1 inch, from about 0.05 inch to about 0.1 inch, from about 0.01 inch to about 0.08 inch, from about 0.01 inch to about 0.05 inch, from about 0.03 inch to about 0.08 inch, from about 0.02 inch to about 0.07 inch, etc. The dense gypsum layer preferably is relatively stiff, particularly in relation to the board core. For example, in some embodiments, the dense gypsum layer has a compressive strength of from about 1000 psi to about 2000 psi according to the board compressive strength test.

The board core generally has a lower density than the dense gypsum layer. For example, in some embodiments, the board core has a dry density of from about 20 pcf to about 35 pcf, such as from about 22 pcf to about 33 pcf, from about 24 pcf to about 31 pcf, from about 25 pcf to about 30 pcf, or from about 26 pcf to about 27 pcf. In some embodiments, the board core is considerably larger than the thickness of the board core. For example, in some embodiments, in the case of nominal ½ thick board, the dense gypsum layer has a thickness of from about 0.01 inch to about 0.1 inch, e.g., from about 0.02 inch to about 0.7 inch, from about 0.025 inch to about 0.6 inch, from about 0.03 inch to about 0.5 inch, etc. For other board thicknesses, one of ordinary skill in the art can readily adjust the measurements proportionately.

The cover sheets, as well as the intermediate sheet, can be fibrous or non-fibrous. In some embodiments, they may be formed from paper, fibrous mat or other type of material (e.g., foil, plastic, glass mat, non-woven material such as blend of cellulosic and inorganic filler, etc.).

The face and back cover sheets can have any suitable basis weight and thickness. Generally, the thickness of the face and back cover sheet (e.g., composed of paper) is determined by the (e.g., paper) weight. For example, in some embodiments, the face and back cover sheets can have a basis weight of from about 10 lb/msf to about 55 lb/msf, e.g., from about 20 lb/msf to about 55 lb/msf, from about 20 lb/msf to about 50 lb/msf, from about 20 lb/msf to about 40 lb/msf, from about 30 lb/msf to about 55 lb/msf, from about 30 lb/msf to about 50 lb/msf, from about 30 lb/msf to about 40 lb/msf, etc. However, in some embodiments, the presence of the intermediate sheet allows for the use of lower weight cover sheets, which thereby reduces expense and/or allows for lower weight board. For example, in some embodiments, one or both of the face and back cover sheets have a weight of from about 15 lb/MSF to about 35 lb/msf, such as from about 20 lb/MSF to about 33 lb/msf, from about 20 lb/MSF to about 31 lb/msf, from about 20 lb/MSF to about 29 lb/msf, from about 20 lb/MSF to about 27 lb/msf, from about 15 lb/MSF to about 31 lb/msf, etc. Boards at such weights can have a nominal thickness of about 0.005 inch to about 0.015 inch thick, e.g., 0.007 to about 0.03 inch (e.g., about 0.01 inch).

The intermediate sheet can also have any suitable basis weight and hence thickness. For example, in some embodiments, the face and back cover sheets can have a basis weight of from about 10 lb/msf to about 55 lb/msf, e.g., from about 10 lbs/msf to about 45 lb/msf, 10 lb/msf to about 40 lb/msf, 20 lb/msf to about 40 lb/msf, 20 lb/msf to about 35 lb/msf, etc. In preferred embodiments, the intermediate sheet has a lower target basis weight, e.g., from about 10 lb/MSF to about 30 lb/msf, such as from about 10 lb/MSF to about 27 lb/msf, from about 15 lb/MSF to about 25 lb/msf, from about 15 lb/MSF to about 23 lb/msf, from about 15 lb/MSF to about 20 lb/msf, etc. Boards at such weights can have a nominal thickness of about 0.005 inch to about 0.05 inch thick, e.g., 0.007 to about 0.03 inch (e.g., about 0.01 inch). Preferably the intermediate sheet has good tensile strength, especially relative to the board core. For example, in some embodiments, the intermediate sheet has a tensile strength of from about 15 lb/inch to about 30 lb/inch according to the following paper tensile test. In this regard, the tensile strength of the paper is determined by a modified TAPPI T494 om-01 method. The test is modified by using a 2 inch wide sample. The sample is dried at 240° F. for 12.5 min. The gauge length of the two clamping jaws is set as 2.000 inches. The speed of separation of jaws is 2 inches/min.

The gypsum layers (board core and dense gypsum layer) are formed from a slurry comprising at least water and stucco. As referred to herein throughout, stucco can be in the form of calcium sulfate alpha hemihydrate, calcium sulfate beta hemihydrate, and/or calcium sulfate anhydrite. In addition to the stucco and water, the board core is formed from an agent that contributes to its lower density, such as a low density filler (e.g., perlite, low density aggregate or the like), or foaming agents. Various foaming agent regimes are well known in the art. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents. The foam can be pregenerated and then added to the stucco slurry. The pregeneration can occur by inserting air into the aqueous foaming agent. Methods and apparatus for generating foam are well known. See, e.g., U.S. Pat. Nos. 4,518,652; 2,080,009; and 2,017,022.

In some embodiments, the foaming agent comprises, consists of, or consists essentially of at least one alkyl sulfate, at least one alkyl ether sulfate, or any combination thereof but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.0005 wt. %, below about 0.001 wt. %, below about 0.00001 wt. %, etc., based on the weight of stucco, as one of ordinary skill in the art will appreciate.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap, e.g., with an alkoxylated alkyl sulfate soap with an alkyl chain length of 8-12 carbon atoms and an alkoxy (e.g., ethoxy) group chain length of 1-4 units. The second foaming agent is optionally an unalkoxylated (e.g., unethoxylated) alkyl sulfate soap with an alkyl chain length of 6-20 carbon atoms, e.g., 6-18 or 6-16 carbon atoms. Regulating the respective amounts of these two soaps, in accordance with some embodiments, is believed to allow for control of the board foam structure until about 100% stable soap or about 100% unstable soap is reached.

In some embodiments, a fatty alcohol optionally can be included with the foaming agent, e.g., in a pre-mix to prepare the foam, as described in U.S. Patent Publications US 2017/0096369 A1, US 2017/0096366 A1, and US 2017/0152177 A1. This can result in an improvement in the stability of the foam, thereby allowing better control of foam (air) void size and distribution. The fatty alcohol can be any suitable aliphatic fatty alcohol. It will be understood that, as defined herein throughout, "aliphatic" refers to alkyl, alkenyl, or alkynyl, and can be substituted or unsubstituted, branched or unbranched, and saturated or unsaturated, and in relation to some embodiments, is denoted by the carbon chains set forth herein, e.g., $C_x$-$C_y$, where x and y are integers. The term aliphatic thus also refers to chains with heteroatom substitution that preserves the hydrophobicity of the group. The fatty alcohol can be a single compound, or can be a combination of two or more compounds. In some embodiments, the optional fatty alcohol is a $C_6$-$C_{20}$ fatty alcohol (e.g., $C_6$-$C_{18}$, $C_6$-$C_{116}$, $C_6$-$C_{14}$, $C_6$-$C_{12}$, $C_6$-$C_{10}$, $C_6$-$C_8$, $C_8$-$C_{16}$, $C_8$-$C_{14}$, $C_8$-$C_{12}$, $C_8$-$C_{10}$, $C_{10}$-$C_{16}$, $C_{10}$-$C_{14}$, $C_{10}$-$C_{12}$, $C_{12}$-$C_{16}$, $C_{12}$-$C_{14}$, or $C_{14}$-$C_{16}$ aliphatic fatty alcohol, etc.). Examples include octanol, nonanol, decanol, undecanol, dodecanol, or any combination thereof.

In some embodiments, the optional foam stabilizing agent comprises the fatty alcohol and is essentially free of fatty acid alkyloamides or carboxylic acid taurides. In some embodiments, the optional foam stabilizing agent is essentially free of a glycol, although glycols can be included in some embodiments, e.g., to allow for higher surfactant content. Essentially free of any of the aforementioned ingredients means that the foam stabilizer contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.0001 wt. %, such as below about 0.00005 wt. %, below about 0.00001 wt. %, below about 0.000001 wt. %, etc., based on the weight of stucco, as one of ordinary skill in the art will appreciate.

It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 µm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, from about 0.7:1 to about 9:1, from about 0.8:1 to about 9:1, from about 1.4:1 to about 9:1, from about 1.8:1 to about 9:1, from about 2.3:1 to about 9:1, from about 0.7:1 to about 6:1, from about 1.4:1 to about 6:1, from about 1.8:1 to about 6:1, from about 0.7:1 to about 4:1, from about 1.4:1 to about 4:1, from about 1.8:1 to about 4:1, from about 0.5:1 to about 2.3:1, from about 0.7:1 to about 2.3:1, from about 0.8:1 to about 2.3:1, from about 1.4:1 to about 2.3:1, from about 1.8:1 to about 2.3:1, etc.

As used herein, a void size is calculated from the largest diameter of an individual void in the core. The largest diameter is the same as the Feret diameter. The largest diameter of each defined void can be obtained from an image of a sample. Images can be taken using any suitable technique, such as scanning electron microscopy (SEM), which provides two-dimensional images. A large number of pore sizes of voids can be measured in an SEM image, such that the randomness of the cross sections (pores) of the voids can provide the average diameter. Taking measurements of voids in multiple images randomly situated throughout the core of a sample can improve this calculation. Additionally, building a three-dimensional stereological model of the core based on several two-dimensional SEM images can also improve the calculation of the void sizes. Another technique is X-ray CT-scanning analysis (XMT), which provides a three-dimensional image. Another technique is optical microscopy, where light contrasting can be used to assist in determining, e.g., the depth of voids. The voids can be measured either manually or by using image analysis software, e.g., ImageJ, developed by NIH. One of ordinary skill in the art will appreciate that manual determination of void sizes and distribution from the images can be determined by visual observation of dimensions of each void. The sample can be obtained by sectioning a gypsum board.

The foaming agent can be included in the core slurry in any suitable amount, e.g., depending on the desired density. A solution of foaming agent is prepared at, for example, about 0.5% (w/w). Proper amount of air is mixed with the proper amount of the solution of foaming agent, and added into slurry. Depending on the amount of air required, the concentration of the solution of the foaming agent can vary from about 0.1% to about 1% (w/w). Since the concentrated layer has a higher density, the slurry for forming the concentrated layer can be made with less (or no) foam.

The fatty alcohol can be present, if included, in the core slurry in any suitable amount. In some embodiments, the fatty alcohol is present in the core slurry in an amount of from about 0.0001% to about 0.03% by weight of the stucco, e.g., from about 0.0001% to about 0.025% by weight of the stucco, from about 0.0001% to about 0.02% by weight of the stucco, or from about 0.0001% to about 0.01% by weight of the stucco. Since the concentrated layer slurry can have less or no foam, the fatty alcohol is not required in the concentrated layer, or else can be included in a lower amount, such as from about 0.0001% to about 0.004% by weight of the stucco, e.g., from about 0.00001% to about 0.003% by weight of the stucco, from about 0.00001% to about 0.0015% by weight of the stucco, or from about 0.00001% to about 0.001% by weight of the stucco.

Strength enhancing additives such as starch can be used in the gypsum slurry, but advantageously, the amount used can be reduced relative to conventional boards (absent the intermediate sheet), or even eliminated. For example, suitable strength enhancing additives are discussed in U.S. patent publications US 2016/0375655 A1, US 2016/0375656 A1, US 2016/0375651 A1, and US 2016/0376191 A1.

Other ingredients as known in the art can also be included in the board core slurry, including, for example, accelerators, retarders, etc. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

In addition, the board core can be further formed from at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. For naphthalenesulfonate dispersants, in some embodiments, they are selected to have molecular weights from about 3,000 to about 10,000 (e.g., about 8,000 to about 10,000). In some embodiments, higher water demand naphthalenesulfonates can be used, e.g., having molecular weights above 10,000. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals, Ambler, Pa.

If included, the dispersant can be provided in any suitable amount. In some embodiments, for example, the dispersant can be present in the concentrated layer slurry in an amount, for example, from about 0.05% to about 0.5%, e.g., about 0.1% to about 0.2% by weight of the stucco, and can be present in the board core slurry in an amount, for example, from about 0% to about 0.7%, e.g., 0% to about 0.4% by weight of the stucco.

In some embodiments, the board core can be further formed from at least one phosphate-containing compound, if desired, to enhance green strength, dimensional stability, and/or sag resistance. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Green strength refers to the strength of the board while still wet during manufacture. Due to the rigors of the manufacturing process, without sufficient green strength, a board precursor can become damaged on a manufacturing line.

Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6–27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$ wherein n=1,000–3,000, or polyphosphoric acid having two or more repeating phosphoric acid units and having the molecular formula $H_{n+2}P_nO_{3n+1}$ wherein n is two or more.

If included, the polyphosphate can be present in any suitable amount. To illustrate, in some embodiments, the polyphosphate can be present in the slurry in an amount, for example, from about 0.1% to about 1%, e.g., about 0.2% to about 0.4% by weight of the stucco, from about 0% to about 0.5%, e.g., from about 0% to about 0.2% by weight of the stucco. Thus, the dispersant and polyphosphate optionally can be in any suitable amount in the core slurry.

The board core can have any suitable density useful in contributing to a desired total composite board density, such as, for example, a core density of from about 16 pcf (about 260 kg/m³) to about 40 pcf, e.g., from about 18 pcf to about 40 pcf, 18 pcf to about 38 pcf, 18 pcf to about 36 pcf, 18 pcf to about 32 pcf, 20 pcf to about 40 pcf, 20 pcf to about 36 pcf, 20 pcf to about 32 pcf, 22 pcf to about 40 pcf, 22 pcf to about 36 pcf, 22 pcf to about 32 pcf, 26 pcf to about 40 pcf, 26 pcf to about 36 pcf, or 26 pcf to about 32 pcf. In some embodiments, the board core has an even lower density, e.g., about 30 pcf or less, about 29 pcf (about 460 kg/m³) or less, about 28 pcf or less, about 27 pcf (about 430 kg/m³) or less, about 26 pcf or less, etc. For example, in some embodiments, the core density is from about 12 pcf (about 190 kg/m³) to about 30 pcf, from about 14 pcf (about 220 kg/m³) to about 30 pcf, 16 pcf to about 30 pcf, 16 pcf to about 28 pcf, 16 pcf to about 26 pcf, 16 pcf to about 22 pcf (about 350 kg/m³), 18 pcf to about 30 pcf, 18 pcf to about 28 pcf, 18 pcf to about 26 pcf, 18 pcf to about 24 pcf, 20 pcf to about 30 pcf, 20 pcf to about 28 pcf, 20 pcf to about 26 pcf, 20 pcf to about 24 pcf, 22 pcf to about 28 pcf, etc.

The gypsum core, dense gypsum layer, cover sheets, and intermediate sheet each can have any suitable Young's modulus. In some embodiments, the dense gypsum layer has a value according to Young's modulus that is from about 0.1 to about 0.7 of the Young's modulus for the intermediate sheet and/or one or both of the cover sheets (e.g., at least the face cover sheet), e.g., from about 0.1 to about 0.5. In some embodiments, the dense gypsum layer has a Young's modulus that is at least about 1.5 times as high as the Young's modulus of the board core, e.g., 2 times as high as the Young's modulus of the board core, such as, for example, from about 2 times to about 10 times, from about 2 times to about 8 times, from about 2 times to about 5 times, etc.

In some embodiments, composite board made according to the disclosure meets test protocols according to ASTM Standard C473-07. For example, in some embodiments, when the board is cast at a thickness of ½ inch, the dry board has a nail pull resistance of at least about 67 lbf (pounds force) as determined according to ASTM C473-07 (method B), e.g., at least about 68 lbf, at least about 70 lbf, at least about 72 lbf, at least about 74 lbf, at least about 75 lbf, at least about 76 lbf, at least about 77 lbf, etc. In various embodiments, the nail pull resistance can be from about 67 lbf to about 100 lbf, from about 67 lbf to about 95 lbf, from about 67 lbf to about 90 lbf, from about 67 lbf to about 85 lbf, from about 67 lbf to about 80 lbf, from about 67 lbf to about 75 lbf, from about 68 lbf to about 100 lbf, from about 68 lbf to about 95 lbf, from about 68 lbf to about 90 lbf, from about 68 lbf to about 85 lbf, from about 68 lbf to about 80 lbf, from about 70 lbf to about 100 lbf, from about 70 lbf to about 95 lbf, from about 70 lbf to about 90 lbf, from about 70 lbf to about 85 lbf, from about 70 lbf to about 80 lbf, from about 72 lbf to about 100 lbf, from about 72 lbf to about 95 lbf, from about 72 lbf to about 90 lbf, from about 72 lbf to about 85 lbf, from about 72 lbf to about 80 lbf, from about 72 lbf to about 77 lbf, from about 72 lbf to about 75 lbf, from about 75 lbf to about 100 lbf, from about 75 lbf to about 95 lbf, from about 75 lbf to about 90 lbf, from about 75 lbf to about 85 lbf, from about 75 lbf to about 80 lbf, from about 75 lbf to about 77 lbf, from about 77 lbf to about 100 lbf, from about 77 lbf to about 95 lbf, from about 77 lbf to about 90 lbf, from about 77 lbf to about 85 lbf, or from about 77 lbf to about 80 lbf.

In some embodiments, the composite gypsum board can have an average core hardness of at least about 11 lbf, e.g., at least about 12 lbf, at least about 13 lbf, at least about 14 lbf, at least about 15 lbf, at least about 16 lbf, at least about 17 lbf, at least about 18 lbf, at least about 19 lbf, at least about 20 lbf, at least about 21 lbf, or at least about 22 lbf, as determined according to ASTM C473-07, method B. In some embodiments, board can have a core hardness of from about 11 lbf to about 25 lbf, e.g., from about 11 lbf to about 22 lbf, from about 11 lbf to about 21 lbf, from about 11 lbf to about 20 lbf, from about 11 lbf to about 19 lbf, from about 11 lbf to about 18 lbf, from about 11 lbf to about 17 lbf, from about 11 lbf to about 16 lbf, from about 11 lbf to about 15 lbf, from about 11 lbf to about 14 lbf, from about 11 lbf to about 13 lbf, from about 11 lbf to about 12 lbf, from about 12 lbf to about 25 lbf, from about 12 lbf to about 22 lbf, from about 12 lbf to about 21 lbf, from about 12 lbf to about 20 lbf, from about 12 lbf to about 19 lbf, from about 12 lbf to about 18 lbf, from about 12 lbf to about 17 lbf, from about 12 lbf to about 16 lbf, from about 12 lbf to about 15 lbf, from about 12 lbf to about 14 lbf, from about 12 lbf to about 13 lbf, from about 13 lbf to about 25 lbf, from about 13 lbf to about 22 lbf, from about 13 lbf to about 21 lbf, from about 13 lbf to about 20 lbf, from about 13 lbf to about 19 lbf, from about 13 lbf to about 18 lbf, from about 13 lbf to about 17 lbf, from about 13 lbf to about 16 lbf, from about 13 lbf to about 15 lbf, from about 13 lbf to about 14 lbf, from about 14 lbf to about 25 lbf, from about 14 lbf to about 22 lbf, from about 14 lbf to about 21 lbf, from about 14 lbf to about 20 lbf, from about 14 lbf to about 19 lbf, from about 14 lbf to about 18 lbf, from about 14 lbf to about 17 lbf, from about 14 lbf to about 16 lbf, from about 14 lbf to about 15 lbf, from about 15 lbf to about 25 lbf, from about 15 lbf to about 22 lbf, from about 15 lbf to about 21 lbf, from about 15 lbf to about 20 lbf, from about 15 lbf to about 19 lbf, from about 15 lbf to about 18 lbf, from about 15 lbf to about 17 lbf, from about 15 lbf to about 16 lbf, from about 16 lbf to about 25 lbf, from about 16 lbf to about 22 lbf, from about 16 lbf to about 21 lbf, from about 16 lbf to about 20 lbf, from about 16 lbf to about 19 lbf, from about 16 lbf to about 18 lbf, from about 16 lbf to about 17 lbf, from about 17 lbf to about 25 lbf, from about 17 lbf to about 22 lbf, from about 17 lbf to about 21 lbf, from about 17 lbf to about 20 lbf, from about 17 lbf to about 19 lbf, from about 17 lbf to about 18 lbf, from about 18 lbf to about 25 lbf, from about 18 lbf to about 22 lbf, from about 18 lbf to about 21 lbf, from about 18 lbf to about 20 lbf, from about 18 lbf to about 19 lbf, from about 19 lbf to about 25 lbf, from about 19 lbf to about 22 lbf, from about 19 lbf to about 21 lbf, from about 19 lbf to about 20 lbf, from about 21 lbf to about 25 lbf, from about 21 lbf to about 22 lbf, or from about 22 lbf to about 25 lbf.

In some embodiments, the dense gypsum layer has an average dry core hardness that is at least about 1.5 times greater than the average dry core hardness of the board core, wherein the average core hardness is measured according to ASTM C-473-07, e.g., at least about 2 times greater, 2.5 times greater, 3 times greater, 3.5 times greater, 4 times greater, 4.5 times greater, etc., wherein each of these ranges can have any mathematically appropriate upper limit, such as, for example, 8, 7, 6, 5, 4, 3, or 2.

With respect to flexural strength, in some embodiments, when cast in a board of ½ inch thickness, the dry board has a flexural strength of at least about 36 lbf in a machine direction (e.g., at least about 38 lbf, at least about 40 lbf, etc.) and/or at least about 107 lbf (e.g., at least about 110 lbf, at least about 112 lbf, etc.) in a cross-machine direction as determined according to the ASTM standard C473-07. In various embodiments, the board can have a flexural strength in a machine direction of from about 36 lbf to about 60 lbf, e.g., from about 36 lbf to about 55 lbf, from about 36 lbf to about 50 lbf, from about 36 lbf to about 45 lbf, from about 36 lbf to about 40 lbf, from about 36 lbf to about 38 lbf, from about 38 lbf to about 60 lbf, from about 38 lbf to about 55 lbf, from about 38 lbf to about 50 lbf, from about 38 lbf to about 45 lbf, from about 38 lbf to about 40 lbf, from about 40 lbf to about 60 lbf, from about 40 lbf to about 55 lbf, from about 40 lbf to about 50 lbf, or from about 40 lbf to about 45 lbf. In various embodiments, the board can have a flexural strength in a cross-machine direction of from about 107 lbf to about 130 lbf, e.g., from about 107 lbf to about 125 lbf, from about 107 lbf to about 120 lbf, from about 107 lbf to about 115 lbf, from about 107 lbf to about 112 lbf, from about 107 lbf to about 110 lbf, from about 110 lbf to about 130 lbf, from about 110 lbf to about 125 lbf, from about 110 lbf to about 120 lbf, from about 110 lbf to about 115 lbf, from about 110 lbf to about 112 lbf, from about 112 lbf to about 130 lbf, from about 112 lbf to about 125 lbf, from about 112 lbf to about 120 lbf, or from about 112 lbf to about 115 lbf.

Advantageously, in various embodiments at various board densities as described herein, the dry composite gypsum board can have a compressive strength of at least about 170 psi (1,170 kPa), e.g., from about 170 psi to about 1,000 psi (6,900 kPa), from about 170 psi to about 900 psi (6,200 kPa), from about 170 psi to about 800 psi (5,500 kPa), from about 170 psi to about 700 psi (4,800 kPa), from about 170 psi to about 600 psi (4,100 kPa), from about 170 psi to about 500 psi (3,450 kPa), from about 170 psi to about 450 psi (3,100 kPa), from about 170 psi to about 400 psi (2,760 kPa), from about 170 psi to about 350 psi (2,410 kPa), from about 170 psi to about 300 psi (2,070 kPa), or from about 170 psi to about 250 psi (1,720 kPa). In some embodiments, the board has a compressive strength of at least about 450 psi (3,100 kPa), at least about 500 psi (3,450 kPa), at least about 550 psi (3,800 kPa), at least about 600 psi (4,100 kPa), at least about 650 psi (4,500 kPa), at least about 700 psi (4,800 kPa), at least about 750 psi (5,200 kPa), at least about 800 psi (5,500 kPa), at least about 850 psi (5,850 kPa), at least about 900 psi (6,200 kPa), at least about 950 psi (6,550 kPa), or at least about 1,000 psi (6,900 kPa). In addition, in some embodiments, the compressive strength can be bound by any two of the foregoing points. For example, the compressive strength can be between about 450 psi and about 1,000 psi (e.g., between about 500 psi and about 900 psi, between about 600 psi and about 800 psi, etc.). The compressive strength as used herein is measured using a materials testing system commercially available as ATS machine model 1610, from Applied Test Systems in Butler, Pa. The load is applied continuously and without a shock at speed of 1 inch/min.

Due at least in part to the intermediate sheet, particularly in conjunction with the dense gypsum layer, and the benefits thereof, surprisingly and unexpectedly, these standards (e.g., nail pull resistance, flexural strength, and core hardness) can be met even with respect to ultra light density board (e.g., about 33 pcf or less, such as about 32 pcf or less, 31 pcf or less, 30 pcf or less, 29 pcf or less, 28 pcf or less, 27 pcf or less, 26 pcf or less, etc.), as described herein. Furthermore, these standards surprisingly can be met in some embodiments while using less overall strength additives and with a lighter cover sheets such that embodiments of the disclosure provide manufacturing efficiencies.

Composite gypsum board according to embodiments of the disclosure can be made on typical gypsum wallboard manufacturing lines. For example, board manufacturing techniques are described in, for example, U.S. Pat. No. 7,364,676 and U.S. Patent Application Publication 2010/0247937. Briefly, the process typically involves discharging a cover sheet onto a moving conveyor. Since gypsum board is normally formed "face down," this cover sheet is the "face" cover sheet in such embodiments.

The slurries for forming the board core and for forming the dense gypsum layer can be formed in any suitable manner. For example, two separate mixers can be used, e.g., in the form of "pin mixers" or "pin-less mixers" as desired, where the raw materials are agitated to form the respective slurries. The mixers can be in series or unconnected. Alternatively, one mixer can be used to develop both slurry streams. If desired for efficiency, the mixer used for the dense gypsum layer can have a smaller mixing volume capacity in some embodiments since the amount of slurry needed to be applied for the dense gypsum layer is less than the amount of slurry that is applied to form the board core. The "main" mixer (i.e., for forming the board core slurry) comprises a main body and a discharge conduit (e.g., a gate-canister-boot arrangement as known in the art, or a modified outlet design (MOD) arrangement as described in U.S. Pat. Nos. 6,494,609 and 6,874,930). Foaming agent can be added in the discharge conduit of the mixer (e.g., in the gate as described, for example, in U.S. Pat. Nos. 5,683,635 and 6,494,609).

In some embodiments, it will be understood that the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1.

Board is formed in a sandwich structure, normally concurrently and continuously, as will be understood in the art. The face cover sheet travels as a continuous ribbon on a moving conveyor. After being discharged from its mixer, the dense gypsum layer slurry is applied to the moving face cover sheet. Also, hard edges, as known in the art, can be formed, e.g., from the same slurry stream forming the concentrated layer for convenience, if desired. The intermediate sheet can also be released (e.g., unwound from a roll) in any suitable configuration. For example, in some embodiments the intermediate sheet can be unwound from a close or similar vicinity as the face cover sheet, e.g., upstream of the mixer. The board manufacturing line can be configured to release the intermediate sheet such that it is directed toward the main mixer and then applied just downstream of the main mixer (e.g., by traveling underneath the main mixer) over the dense gypsum layer. The intermediate sheet can be applied continuously over the dense gypsum layer slurry such that the amount of washout of the dense gypsum layer is reduced in accordance with preferred embodiments of the invention.

The board core slurry is then applied over the intermediate sheet and covered with a second cover sheet (typically the "back" cover sheet) to form a wet assembly in the form of a sandwich structure that is a board precursor to the final product. The back (bottom) cover sheet may optionally bear a second dense gypsum layer, which can be formed from the same or different gypsum slurry as for the first dense gypsum layer. In some embodiments, the dense gypsum layer is applied on both major sides of the board, i.e., in bonding relation to both the top and bottom sheets.

In some embodiments, the face paper (which is face down at the wet end of the board machine) can be made to be slightly wider than the width of the final board product since the edges of the paper can be folded up and over the edges of the board to meet the back paper (face up at the wet end of the board machine) to form a board envelope. For example, for nominal 48 inch wide board, the face paper can have a width of about 50 inches or more (e.g., from about 50 to about 52 inches, such as about 50.375 inches). Correspondingly, in some embodiments, the back paper can be made to be narrower than the width of the board. Thus, for nominal 48 inch wide board, the back paper can have a width of less than about 48 inches (e.g., from about 46.5 inches to about 47.5 inches, such as about 47.125 inches).

The intermediate sheet can be made at any suitable width up to the width of the final board product. Desirably, to reduce cost, the intermediate sheet can have a narrower width than the board width. For example, for nominal 48 inch wide board, the intermediate sheet can have a width of from about 26 inches to about 48 inches, such as from about 26 inches to about 42 inches, from about 26 inches to about 40 inches, from about 26 to about 36 inches, from about 26 inches to about 35 inches, from about 26 inches to about 32 inches, from about 26 inches to about 30 inches, etc.

For boards of other target widths, one of ordinary skill in the art will readily be able to use face, back, and intermediate sheets of sizes proportional to the sizes described above. For example, for 48 inch wide board or other desired board widths, the intermediate sheet can have a width of from about 50% to about 100% of the target width of the board product, e.g., from about 50% to about 75%, from about 50% to about 67%, from about 50% to about 60%, from about 54% to about 100%, from about 54% to about 75%, from about 54% to about 67%, from about 54% to about 60%, etc., wherein the center (width-wise) of the intermediate sheet is preferably nominally targeted to be positioned over the center of the board, width-wise.

Like the cover sheets, the intermediate sheet can be formed of any suitable material, e.g., paper, thermoplastic, thermoset, etc. The material is preferably porous so that the permeability reduces negative effects on drying efficiency on the line including when excess water is dried off, e.g., in a kiln. However, if desired, non-porous materials can be used if desired.

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). Surprisingly and unexpectedly, it has been found that board prepared according to the disclosure requires significantly less time in a drying process because of the low water demand characteristic of the board arrangement and composition. This is advantageous because it reduce energy costs.

It also is common in the manufacture of gypsum board to use vibration in order to eliminate large voids or air pockets from the deposited slurry. Each of the above steps, as well as processes and equipment for performing such steps, are known in the art.

The invention is further illustrated by the following exemplary embodiments. However, the invention is not limited by the following embodiments.

(1) A composite gypsum board or method of making a composite gypsum board as described herein.

(2) A composite gypsum board comprising: (a) a board core comprising set gypsum formed from a slurry comprising at least water and stucco, the core defining first and second core faces; (b) an intermediate sheet having first and second faces, the first face of the intermediate sheet facing the first core face; (c) a dense gypsum layer having first and second faces, the first face of the dense gypsum layer facing the second face of the intermediate sheet; (d) a face cover sheet having first and second faces, the first face of the face cover sheet facing the second face of the dense gypsum layer; and (e) a back cover sheet having first and second faces, the first face of the back cover sheet facing the second face of the board core.

(3) The composite gypsum board of embodiment 2, wherein the intermediate sheet is formed from paper.

(4) The composite gypsum board of embodiments 2 or 3, wherein the intermediate sheet has a basis weight of about 10 lb/msf to about 55 lb/msf.

(5) The composite gypsum board of any one of embodiments 2-4, wherein the face and cover sheets have a basis weight of about 15 lb/msf to about 55 lb/msf.

(6) The composite gypsum board of any one of embodiments 2-5, wherein the board core has a density of about 15 pcf to about 35 pcf, the dense gypsum layer has a density of about 35 pcf to about 55 pcf, and the ratio of the density of the dense gypsum layer to the density of the board core is at least about 1.2.

(7) The composite gypsum board of any one of embodiments 2-6, wherein the dense gypsum layer has a compressive strength of from about 1000 psi to about 2000 psi.

(8) The composite gypsum board of any one of embodiments 2-7, wherein the intermediate sheet has a tensile strength of from about 10 lb/inch to about 50 lb/inch.

(9) The composite gypsum board of any one of embodiments 2-8, wherein the board has a density of from about 20 pcf to about 40 pcf.

(10) The composite gypsum board of any one of embodiments 2-9, wherein the amount of pregelatinized starch in the slurry is from about 0% to about 0.5% by weight of stucco.

(11) The composite gypsum board of any one of embodiments 2-10, wherein the intermediate sheet has a width of from about 26 inches to about 40 inches.

(12) The composite gypsum board of any one of embodiments 2-11, wherein the intermediate sheet has a width of from about 26 inches to about 30 inches.

(13) The composite gypsum board of any one of embodiments 2-12, wherein the intermediate sheet has a basis weight of from about 5 lb/MSF to about 30 MSF.

(14) The composite gypsum board of any one of embodiments 2-13, wherein the intermediate sheet has a basis weight of from about 10 lb/MSF to about 20 lb/MSF.

(15) The composite gypsum board of any one of embodiments 2-14, wherein one or both of the cover sheets has a basis weight of from about 25 lb/MSF to about 35 lb/MSF.

(16) The composite gypsum board of any one of embodiments 2-15, wherein the board has a nail pull strength of at least about 77 lbs force according to ASTM 473-07.

(17) The composite gypsum board of any one of embodiments 2-16, wherein: the intermediate sheet has a basis weight of from about 5 lb/MSF to about 25 lb/MSF and has a width of from about 26 inch to about 40 inch; the face and back cover sheets have a basis weight of from about 15 lb/MSF to about 35 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(18) The composite gypsum board of any one of embodiments 2-17, wherein: the intermediate sheet has a basis weight of from about 5 lb/MSF to about 22 lb/MSF and has a width of from about 26 inch to about 35 inch; the face and back cover sheets have a basis weight of from about 15 lb/MSF to about 35 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(19) The composite gypsum board of any one of embodiments 2-18, wherein: the intermediate sheet has a basis weight of from about 10 lb/MSF to about 22 lb/MSF and has a width of from about 26 inch to about 35 inch; the face and back cover sheets have a basis weight of from about 20 lb/MSF to about 32 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(20) The composite gypsum board of any one of embodiments 2-19, wherein: the intermediate sheet has a basis weight of from about 5 lb/MSF to about 25 lb/MSF and has a width of from about 54% to about 75% of a target width of the board; the face and back cover sheets have a basis weight of from about 15 lb/MSF to about 35 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(21) The composite gypsum board of any one of embodiments 2-20, wherein: the intermediate sheet has a basis weight of from about 5 lb/MSF to about 25 lb/MSF and has a width of from about 54% to about 67% of a target width of the board; the face and back cover sheets have a basis weight of from about 20 lb/MSF to about 35 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(22) The composite gypsum board of any one of embodiments 2-21, wherein: the intermediate sheet has a basis weight of from about 10 lb/MSF to about 22 lb/MSF and has a width of from about 54% to about 60% of a target width of the board; the face and back cover sheets have a basis weight of from about 20 lb/MSF to about 32 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(23) A method of making composite gypsum board, the method comprising: (a) preparing a first slurry comprising at least stucco and water; (b) applying the first slurry in a bonding relation to a first cover sheet to form a dense gypsum layer, the dense gypsum layer having a first face and a second face, wherein the first face of the dense gypsum layer faces the first cover sheet; (c) applying an intermediate sheet having first and second faces to the second face of the dense gypsum layer; (d) mixing at least water, stucco and foaming agent to form a second slurry; (e) applying the second slurry in a bonding relation to the intermediate sheet to form a board core having a first face and a second face, the first board core face facing the second face of the intermediate sheet; (f) applying a second cover sheet in bonding relation to the second board core face to form a board precursor; and (g) drying the board precursor to form a board, wherein, when dried, the dense gypsum layer has a higher density than the board core.

(24) The method of embodiment 23, wherein the intermediate sheet is formed from paper.

(25) The method of embodiments 23 or 24, wherein the intermediate sheet has a basis weight of about 10 lb/msf to about 50 lb/msf.

(26) The method of any one of embodiments 23-25, wherein the face and cover sheets have a basis weight of about 15 lb/msf to about 55 lb/msf.

(27) The method of any one of embodiments 23-26, wherein the board core has a density of about 15 pcf to about 40 pcf, the dense gypsum layer has a density of about 40 pcf to about 55 pcf, and the ratio of the density of the dense gypsum layer to the density of the board core is at least about 1.2.

(28) The method of any one of embodiments 23-27, wherein the dense gypsum layer has a compressive strength of from about 1000 psi to about 2000 psi.

(29) The method of any one of embodiments 23-28, wherein the intermediate sheet has a tensile strength of about 10 lb/inch to about 50 lb/inch.

(30) The method of any one of embodiments 23-29, wherein the board has a density of from about 20 pcf to about 31 pcf.

(31) The method of any one of embodiments 23-30, wherein the amount of starch in the slurry is from about 0% to about 0.5% by weight of stucco.

(32) The method of any one of embodiments 23-31, wherein the intermediate sheet has a width of from about 26 inches to about 40 inches.

(33) The method of any one of embodiments 23-32, wherein the intermediate sheet has a width of from about 26 inches to about 30 inches.

(34) The method of any one of embodiments 23-33, wherein the intermediate sheet has a basis weight of from about 5 lb/MSF to about 30 MSF.

(35) The method of any one of embodiments 23-34, wherein the intermediate sheet has a basis weight of from about 10 lb/MSF to about 20 lb/MSF.

(36) The method of any one of embodiments 23-35, wherein one or both of the cover sheets has a basis weight of from about 25 lb/MSF to about 35 lb/MSF.

(37) The method of any one of embodiments 23-36, wherein the board has a nail pull strength of at least about 77 lbs force according to ASTM 473-07.

(38) The method of any one of embodiments 23-37, wherein: the intermediate sheet has a basis weight of from about 5 lb/MSF to about 25 lb/MSF and has a width of from about 26 inch to about 40 inch; the face and back cover sheets have a basis weight of from about 15 lb/MSF to about 35 lb/MSF; the board has a nail pull strength of at least about 72 lbs force (e.g., at least about 77 lbs force) according to ASTM 473-07; and the board has a density of about 35 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(39) The method of any one of embodiments 23-38, wherein: the intermediate sheet has a basis weight of from about 5 lb/MSF to about 22 lb/MSF and has a width of from about 26 inch to about 35 inch; the face and back cover sheets have a basis weight of from about 15 lb/MSF to about 35 lb/MSF; the board has a nail pull strength of at least about 72 lbs force (e.g., at least about 77 lbs force) according to ASTM 473-07; and the board has a density of about 33 pcf or less (e.g., about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(40) The method of any one of embodiments 23-39, wherein: the intermediate sheet has a basis weight of from about 10 lb/MSF to about 22 lb/MSF and has a width of from about 26 inch to about 35 inch; the face and back cover sheets have a basis weight of from about 20 lb/MSF to about 32 lb/MSF; the board has a nail pull strength of at least about 72 lbs force (e.g., at least about 77 lbs force) according to ASTM 473-07; and the board has a density of about 31 pcf or less (e.g., about 31 pcf or less, about 27 pcf or less, such as about from about 15 pcf to about 33 pcf, from about 15 pcf to about 31 pcf, from about 15 pcf to about 27 pcf, etc.).

(41) The method of any one of embodiments 23-40, wherein: the intermediate sheet has a basis weight of from about 5 lb/MSF to about 25 lb/MSF and has a width of from about 54% to about 75% of a target width of the board; the face and back cover sheets have a basis weight of from about 15 lb/MSF to about 35 lb/MSF; the board has a nail pull strength of at least about 72 lbs force (e.g., at least about 77 lbs force) according to ASTM 473-07; and the board has a density of about 35 pcf or less (e.g., about 35 pcf or less, about 33 pcf or less, about 31 pcf or less, about 27 pcf or less, such as about from about 15 pcf to about 35 pcf, from about 15 pcf to about 33 pcf, from about 15 pcf to about 31 pcf, from about 15 pcf to about 27 pcf, etc.).

(42) The method of any one of embodiments 23-41, wherein: the intermediate sheet has a basis weight of from about 5 lb/MSF to about 25 lb/MSF and has a width of from about 54% to about 67% of a target width of the board; the face and back cover sheets have a basis weight of from about 20 lb/MSF to about 35 lb/MSF; the board has a nail pull strength of at least about 72 lbs force (e.g., at least about 77 lbs force) according to ASTM 473-07; and the board has a density of about 33 pcf or less (e.g., about 33 pcf or less, about 31 pcf or less, about 27 pcf or less, such as from about 15 pcf to about 33 pcf, from about 15 pcf to about 31 pcf, from about 15 pcf to about 27 pcf, etc.).

(43) The method of any one of embodiments 23-42, wherein: the intermediate sheet has a basis weight of from about 10 lb/MSF to about 22 lb/MSF and has a width of from about 54% to about 60% of a target width of the board; the face and back cover sheets have a basis weight of from about 20 lb/MSF to about 32 lb/MSF; the board has a nail pull strength of at least about 72 lbs force (e.g., at least about 77 lbs force) according to ASTM 473-07; and the board has a density of about 31 pcf or less (e.g., about 30 pcf or less, about 27 pcf or less, such as about from about 15 pcf to about 31 pcf, from about 15 pcf to about 27 pcf, etc.).

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

This example demonstrates that a composite gypsum panel with a paper web between a "dense gypsum layer," and the core can significantly increase nail pull strength.

Two different boards were tested. Board 1 was a comparative board, absent a paper between the dense gypsum layer and the core. The configuration of Board 1 is listed in Table 1.

Table 1. Configuration of Board 1.

TABLE 1

| Configuration of Board 1. | | | | | |
|---|---|---|---|---|---|
| | Back Newsline | Core | Intermediate paper | Dense Gypsum Layer | Face Manila | Total |
| Dry Weight (lb/MSF) | 33 | 912 | 0 | 208 | 47 | 1200 |
| Caliper (in) | 0.010 | 0.420 | 0.000 | 0.050 | 0.015 | 0.495 |
| Density (pcf) | | 26.1 | | 50.0 | | 29.1 |

Board 2 was a composite gypsum board with a lightweight paper between the dense gypsum layer and the core, as shown in Table 2.

TABLE 2

| Configuration of Board 2. | | | | | |
|---|---|---|---|---|---|
| | Back Newsline | Core | Intermediate paper | Dense Gypsum Layer | Face Manila | Total |
| Dry Weight (lb/MSF) | 33 | 889 | 33 | 208 | 47 | 1210 |
| Caliper (in) | 0.010 | 0.409 | 0.010 | 0.050 | 0.015 | 0.495 |
| Density (pcf) | | 26.1 | | 50.0 | | 29.3 |

Each board was produced as a 6-inch by 6-inch laboratory sample following the general arrangement shown in Tables 1 and 2. Each board had a total thickness of about one-half inch. The composition of the gypsum slurry used in making the boards is listed in Table 3. The stucco was in the form of calcium sulfate hemihydrate (beta form), the heat resistant accelerator was in the form of gypsum seeds coated with glucose; dispersant was in the form of naphthalene sulfonate, and the retarder was in the form of an aqueous solution of the pentasodium salt of diethylenetriaminepentaacetic acid, commercially available as Versenex™ 80 from DOW Chemical Company, Midland, Mich.

TABLE 3

| Gypsum slurry composition of Boards 1 and 2. | | |
|---|---|---|
| | Grams (g) | Wt. % (stucco basis) |
| Stucco | 300 | 100 |
| Heat Resistance Accelerator | 3 | 1 |
| Pregelled starch | 4.5 | 1.5 |
| Sodium trimetaphosphate (STMP) 10% solution | 6 | 2 |
| Dispersant | 1.5 | 0.5 |
| Retarder solution 1% | 8 | 2.7 |
| Water | 261 | 87 |
| Total | 584 | |

The density was adjusted by adding air foam to a dry density listed in Tables 1 and 2.

Nail pull strength was tested in accordance with ASTM 473-07, Method B. The nail pull values are reported in Table 4.

TABLE 4

| Nail pull strength. | |
|---|---|
| | Nail Pull (lb) |
| Board 1 (comparative) | 66.5 |
| Board 2 | 81.0 |

As can be seen from Table 4, the comparative sample (Board 1) had a relatively lower nail pull strength value, whereas the composite Board 2 exhibited improved nail pull strength.

A nail pull test of Boards 1 and 2 was conducted in accordance with ASTM 473-07, Method B. The test provides a measure of the ability of gypsum board to resist nail pull-through by determining the load required to push a standard nail head into the sample until the sample collapses. The load (lbs) applied and the moving distance of the nail head (i.e., "displacement") (inches) are plotted in FIG. 2 for both boards in accordance with the test. The curves shown in FIG. 2 therefore depict the relationship between force (load) and the displacement of the nail head and, without wishing to be bound by any particular theory, are believed to illustrate how the composite board containing the dense layer and intermediate paper improved the nail pull strength.

Young's modulus, which can be determined using a dynamic mechanical analyzer in accordance with embodiments of the present disclosure, can be used to evaluate the mechanical property (stiffness) of a solid. Young's modulus relates to the ratio of stress to strain. Stress is the force per unit area, while strain is contraction per unit length. In the nail pull test, the ratio of load to displacement (the slope) was used to approximate the ratio of stress to strain since the test is not designed to directly measure Young's modulus.

Figure 2:
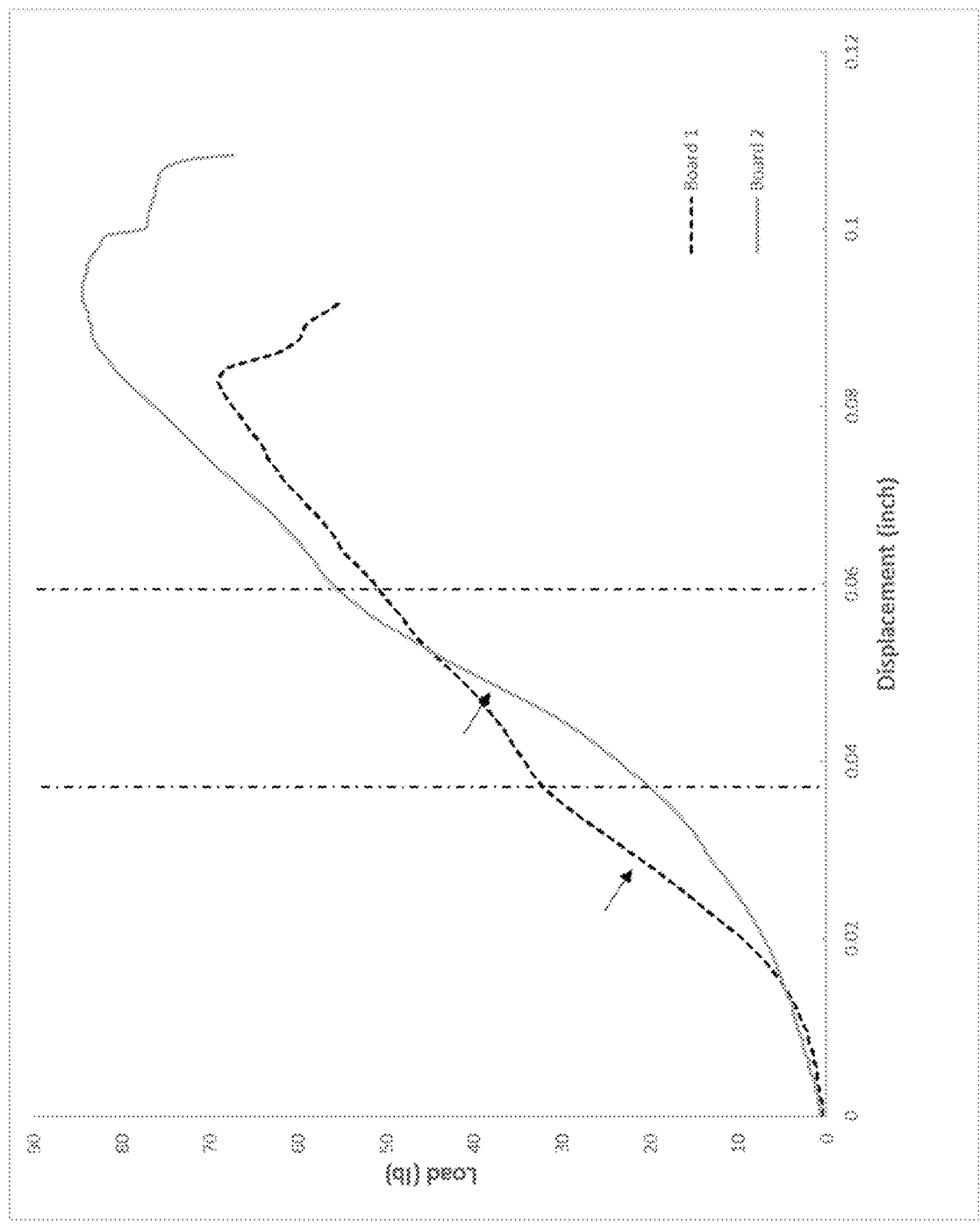
FIG. 2 is a graph of load (lbs) versus displacement (inches) from a nail pull test of Board Samples 1 and 2 according to ASTM 473-07, Method B, as discussed in Example 1.

In the curves, the gypsum layers (including both the gypsum core and the dense gypsum layer) contribute to the load increase before the vertical lines of FIG. 2. The steep slope on each curve (as illustrated with the arrows in FIG. 2) is believed to reflect the presence of the gypsum layers, especially the dense gypsum layer which generally has a higher stiffness than the gypsum core layer. The corresponding slopes are similar for both boards, since the respective gypsum layers of the two boards were prepared to have the same compositions and densities. The vertical line also indicates the break of the dense gypsum layer. After the vertical line, the load increase is attributed to the face paper.

As seen in FIG. 2, the curve of load versus displacement demonstrated that the intermediate paper increased the strain at break of the dense layer. In this respect, Board 2 experienced a bigger displacement at break, i.e., 0.059 inch for Board 2 vs. 0.037 inch for comparative Board 1. The nail pull strength (peak load) is determined by both the slope and the displacement at break. The results shown in FIG. 2 demonstrate that the intermediate paper enhanced the integrity of the composite board. While not wishing to be bound by any particular theory, it is believed that the intermediate paper synergistically helped hold the dense gypsum layer together such that the break required a bigger displacement. Thus, this example illustrates that an improved composite design, containing an intermediate paper in accordance with the present disclosure, enhances nail pull strength by increasing the displacement at break of the dense gypsum layer.

Example 2

This example demonstrates the benefit of the composite design incorporating a paper between the dense gypsum layer and the core.

Conventionally, a high level of pregelatinized starch was used in the board core, combined with heavy weight face paper (see, e.g., U.S. Pat. No. 8,197,952), and high level of sodium trimetaphosphate ("STMP" herein) (see, e.g., U.S. Pat. No. 8,500,904) to reduce board weight while maintaining nail pull strength (e.g., greater than 67 lb, 70 lb, 72, lb, 75 lb, 78 lb, etc., according to ASTM 473-07). A composite board design with a high level of pregelatinized starch in a concentrated layer was used to further reduce board weight (see, e.g., U.S. patent application Ser. No. 15/186,232, 15/186,257, 15/186,147, and 15/186,176). However, the composite design used high levels of pregelatinized starch in both the core and the concentrated layer, and required a secondary mixer to make high starch concentrated layer slurry.

In accordance with preferred embodiments of the present disclosure, a composite gypsum board achieves one or more of the following advantages: it reduces or eliminates the usage of pregelatinized starch, reduces the usage of STMP, reduces face paper weight, and/or efficiently uses dense gypsum layer slurry from the main mixer to make the composite gypsum panel without the need for a separate formulation.

A Board 3 laboratory sample was made following the arrangement shown in Table 5.

TABLE 5

Configuration of Boards 3 and 4.

| | Back Newsline | Core | Intermediate paper | Dense Gypsum Layer | Face Manila | Total |
|---|---|---|---|---|---|---|
| Dry Weight (lb/MSF) | 33 | 872 | 33 | 321 | 41 | 1300 |
| Caliper (in) | 0.010 | 0.392 | 0.010 | 0.070 | 0.013 | 0.495 |
| Density (pcf) | | 26.7 | | 55.0 | | 31.5 |

The composition of the gypsum slurry used in making Board 3 is listed in Table 6, and as described in relation to Table 3.

TABLE 6

Gypsum slurry composition of Board 3.

| | Grams (g) | Wt. % (stucco basis) |
|---|---|---|
| Stucco | 300 | 100 |
| Heat Resistance Accelerator | 3 | 1 |
| Pregelled starch | 3.12 | 1.04 |
| STMP 10% solution | 3.12 | 1.04 |
| Dispersant | 1.5 | 0.5 |
| Retarder solution 1% | 8 | 2.7 |
| Water | 261 | 87 |
| Total | 579.74 | |

Board 3 reduced pregelled starch usage from 20 lb/msf to 10 lb/msf and reduced face paper weight from 50 lb/msf to 41 lb/msf. The nail pull strength is reported in Table 12.

Board 4 laboratory sample was made following the arrangement shown in Table 5. The composition of the gypsum slurry used in making the board is listed in Table 7 and as described in relation to Table 3.

TABLE 7

Gypsum slurry composition of Board 4.

| | Grams (g) | Wt. % (stucco basis) |
|---|---|---|
| Stucco | 300 | 100 |
| Heat Resistance Accelerator | 3 | 1 |
| Pregelled starch | 0.93 | 0.31 |
| Bond starch | 0.93 | 0.31 |
| STMP 10% solution | 3 | 1 |
| Dispersant | 1.5 | 0.5 |
| Retarder solution 1% | 8 | 2.7 |
| Water | 261 | 87 |
| Total | 578.36 | |

Board 4 reduced pregelled starch usage to 3 lb/msf, acid modified bond starch usage to 3 lb/msf, and face paper weight to 41 lb/msf. The nail pull strength is reported in Table 12.

Board 5 laboratory sample was made following the arrangement shown in Table 8.

TABLE 8

Configuration of Board 5.

| | Back Newsline | Core | Intermediate paper | Dense Gypsum Layer | Face Manila | Total |
|---|---|---|---|---|---|---|
| Dry Weight (lb/MSF) | 33 | 1064 | 33 | 229 | 41 | 1400 |
| Caliper (in) | 0.010 | 0.412 | 0.010 | 0.050 | 0.013 | 0.495 |
| Density (pcf) | | 31.0 | | 55.0 | | 33.9 |

The composition of the gypsum slurry used in making the board is listed in Table 9 and as described in relation to Table 3.

TABLE 9

Gypsum slurry composition of Boards 5 and 6.

|  | Grams (g) | Wt. % (stucco basis) |
|---|---|---|
| Stucco | 300 | 100 |
| Heat Resistance Accelerator | 3 | 1 |
| Pregelled starch | NA | NA |
| Bond starch | 1.65 | 0.55 |
| STMP 10% solution | 1.35 | 0.45 |
| Dispersant | 1.5 | 0.5 |
| Retarder solution 1% | 8 | 2.7 |
| Water | 249 | 83 |
| Total | 564.5 | |

Board 5 used 6 lb/msf of acid modified bond starch and completely eliminated the usage of pregelatinized starch. Board 5 also reduced STMP usage from 1 lb/msf to 0.5 lb/msf. The face paper was 41 lb/msf Manila paper. The nail pull strength is reported in Table 12.

Board 6 laboratory sample was made following the arrangement shown in Table 10.

TABLE 10

Configuration of Board 6.

|  | Back Newsline | Core | Intermediate paper | Dense Gypsum Layer | Face Newsline | Total |
|---|---|---|---|---|---|---|
| Dry Weight (lb/MSF) | 33 | 1072 | 33 | 229 | 33 | 1400 |
| Caliper (in) | 0.010 | 0.414 | 0.010 | 0.050 | 0.010 | 0.495 |
| Density (pcf) |  | 31.1 |  | 55.0 |  | 33.9 |

The composition of the gypsum slurry is the same as was used with Board 5. The face paper was replaced with a 33 lb/msf paper normally used as Newsline paper. The nail pull strength is reported in Table 12.

Board 7 laboratory sample was made following the arrangement shown in Table 11. The composition of the gypsum slurry are listed in Table 9. The weight of middle paper was reduced to 24 lb/msf. The board weight is 1270 lb/msf. The nail pull strength of Board 7 was 91.7 lb.

TABLE 11

Configuration of Board 7

|  | Back Newsline | Core | Middle paper | Dense Gypsum Layer | Face paper | Total |
|---|---|---|---|---|---|---|
| Dry Weight (lbs/MSF) | 33 | 951 | 24 | 229 | 33 | 1270 |
| Caliper (in) | 0.010 | 0.414 | 0.010 | 0.050 | 0.010 | 0.495 |
| Density (pcf) |  | 27.5 |  | 55.0 |  | 30.8 |

With the disclosed composite design, Boards 3-7 all exceeded a nail pull requirement of 77 lb despite the reduction of pregelatinized starch usage, and/or STMP usage, and/or face paper weight.

TABLE 12

Nail pull strength.

|  | Nail Pull (lb) |
|---|---|
| Board 3 | 94.8 |
| Board 4 | 89.4 |
| Board 5 | 102 |
| Board 6 | 93.9 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A composite gypsum board comprising:
   (a) a board core comprising set gypsum formed from a core slurry comprising at least water and stucco, the core defining first and second core faces;
   (b) an intermediate sheet having first and second faces, the first face of the intermediate sheet facing the first core face;

(c) a dense gypsum layer having first and second faces, the first face of the dense gypsum layer facing the second face of the intermediate sheet;
(d) a face cover sheet having first and second faces, the first face of the face cover sheet facing the second face of the dense gypsum layer; and
(e) a back cover sheet having first and second faces, the first face of the back cover sheet facing the second face of the board core,
the board core having a density of about 15 pcf to about 35 pcf, the dense gypsum layer having a density of about 35 pcf to about 55 pcf, and the ratio of the density of the dense gypsum layer to the density of the board core being at least about 1.2.

2. The composite gypsum board of claim 1, wherein the intermediate sheet is formed from paper.

3. The composite gypsum board of claim 1, wherein the intermediate sheet has a tensile strength of from about 10 lb/inch to about 50 lb/inch.

4. The composite gypsum board of claim 1, the slurry further comprising pregelatinized starch in an amount of about 0.5% or less by weight of stucco.

5. The composite gypsum board of claim 1, wherein the intermediate sheet has a width of from about 26 inches to about 40 inches.

6. The composite gypsum board of claim 1, wherein the intermediate sheet has a basis weight of from about 10 lb/MSF to about 30 lb/MSF.

7. The composite gypsum board of claim 6, wherein:
the intermediate sheet has a width of from about 26 inch to about 40 inch;
the face and back cover sheets have a basis weight of from about 15 lb/MSF to about 35 lb/MSF;
the board has a nail pull strength of at least about 72 lbs force according to ASTM 473-07; and
the board has a density of about 35 pcf or less.

8. The composite gypsum board of claim 6, wherein:
the intermediate sheet has a width of from about 26 inch to about 35 inch;
the face and back cover sheets have a basis weight of from about 15 lb/MSF to about 35 lb/MSF;
the board has a nail pull strength of at least about 72 lbs force according to ASTM 473-07; and
the board has a density of about 35 pcf or less.

9. The composite gypsum board of claim 6, wherein:
the intermediate sheet has a width of from about 26 inch to about 35 inch;
the face and back cover sheets have a basis weight of from about 20 lb/MSF to about 32 lb/MSF;
the board has a nail pull strength of at least about 72 lbs force according to ASTM 473-07; and
the board has a density of about 35 pcf or less.

10. A method of making the composite gypsum board of claim 1, the method comprising:
(a) preparing a first slurry comprising at least stucco and water;
(b) applying the first slurry to form the dense gypsum layer in a bonding relation to the face cover sheet
(c) applying the intermediate sheet to the dense gypsum layer;
(d) mixing at least the water, the stucco and foaming agent to form the core slurry;
(e) applying the core slurry to form the board core in a bonding relation to the intermediate sheet;
(f) applying the back cover sheet in bonding relation to the core to form a board precursor; and
(g) drying the board precursor to form the board.

11. A composite gypsum board comprising:
(a) a board core comprising set gypsum formed from a core slurry comprising at least water, stucco, and pregelatinized starch in an amount of about 0.5% or less by weight of stucco, the core defining first and second core faces;
(b) an intermediate sheet having first and second faces, the first face of the intermediate sheet facing the first core face;
(c) a dense gypsum layer having first and second faces, the first face of the dense gypsum layer facing the second face of the intermediate sheet;
(d) a face cover sheet having first and second faces, the first face of the face cover sheet facing the second face of the dense gypsum layer; and
(e) a back cover sheet having first and second faces, the first face of the back cover sheet facing the second face of the board core.

12. The composite gypsum board of claim 11, wherein the intermediate sheet has a basis weight of from about 10 lb/MSF to about 30 lb/MSF.

13. The composite gypsum board of claim 11, wherein:
the intermediate sheet has a basis weight of from about 10 lb/MSF to about 30 lb/MSF and has a width of from about 26 inch to about 40 inch;
the face and back cover sheets have a basis weight of from about 15 lb/MSF to about 35 lb/MSF;
the board has a nail pull strength of at least about 72 lbs force according to ASTM 473-07; and
the board has a density of about 35 pcf or less.

14. The composite gypsum board of claim 11, wherein:
the intermediate sheet has a basis weight of from about 10 lb/MSF to about 30 lb/MSF and has a width of from about 26 inch to about 35 inch;
the face and back cover sheets have a basis weight of from about 15 lb/MSF to about 35 lb/MSF;
the board has a nail pull strength of at least about 72 lbs force according to ASTM 473-07; and
the board has a density of about 35 pcf or less.

15. The composite gypsum board of claim 11, wherein:
the intermediate sheet has a basis weight of from about 10 lb/MSF to about 30 lb/MSF and has a width of from about 26 inch to about 35 inch;
the face and back cover sheets have a basis weight of from about 20 lb/MSF to about 32 lb/MSF;
the board has a nail pull strength of at least about 72 lbs force according to ASTM 473-07; and
the board has a density of about 35 pcf or less.

16. A composite gypsum board comprising:
(a) a board core comprising set gypsum formed from a core slurry comprising at least water and stucco, the core defining first and second core faces;
(b) an intermediate sheet having a basis weight of from about 10 lb/MSF to about 30 lb/MSF, the intermediate sheet having first and second faces, the first face of the intermediate sheet facing the first core face;
(c) a dense gypsum layer having first and second faces, the first face of the dense gypsum layer facing the second face of the intermediate sheet;
(d) a face cover sheet having first and second faces, the first face of the face cover sheet facing the second face of the dense gypsum layer; and
(e) a back cover sheet having first and second faces, the first face of the back cover sheet facing the second face of the board core.

17. The composite gypsum board of claim 16, wherein the intermediate sheet has a tensile strength of from about 10 lb/inch to about 50 lb/inch.

18. The composite gypsum board of claim 16, wherein the intermediate sheet has a width of from about 26 inches to about 40 inches.

19. The composite gypsum board of claim 16, wherein:
the intermediate sheet has a width of from about 54% to about 75% of a target width of the board;
the face and back cover sheets have a basis weight of from about 15 lb/MSF to about 35 lb/MSF;
the board has a nail pull strength of at least about 72 lbs force according to ASTM 473-07; and
the board has a density of about 35 pcf or less.

20. The composite gypsum board of claim 16, wherein:
the intermediate sheet has a width of from about 54% to about 67% of a target width of the board;
the face and back cover sheets have a basis weight of from about 20 lb/MSF to about 35 lb/MSF;
the board has a nail pull strength of at least about 72 lbs force according to ASTM 473-07; and
the board has a density of about 33 pcf or less.

21. The composite gypsum board of claim 16, wherein:
the intermediate sheet has a width of from about 54% to about 60% of a target width of the board;
the face and back cover sheets have a basis weight of from about 20 lb/MSF to about 32 lb/MSF;
the board has a nail pull strength of at least about 72 lbs force according to ASTM 473-07; and
the board has a density of about 31 pcf or less.

22. A method of making the composite gypsum board of claim 11, the method comprising:

(a) preparing a first slurry comprising at least stucco and water;
(b) applying the first slurry to form the dense gypsum layer in a bonding relation to the face cover sheet;
(c) applying the intermediate sheet to the dense gypsum layer;
(d) mixing at least the water, the stucco, the pregelatinized starch, and foaming agent to form the core slurry;
(e) applying the core slurry to form the board core in a bonding relation to the intermediate sheet;
(f) applying the back cover sheet in bonding relation to the core to form a board precursor; and
(g) drying the board precursor to form the board, wherein, when dried, the dense gypsum layer has a higher density than the board core.

23. A method of making the composite gypsum board of claim 16, the method comprising:

(a) preparing a first slurry comprising at least stucco and water;
(b) applying the first slurry to form the dense gypsum layer in a bonding relation to the face cover sheet;
(c) applying the intermediate sheet to the dense gypsum layer;
(d) mixing at least the water, the stucco and foaming agent to form the core slurry;
(e) applying the core slurry to form the board core in a bonding relation to the intermediate sheet;
(f) applying the back cover sheet in bonding relation to the core to form a board precursor; and
(g) drying the board precursor to form the board, wherein, when dried, the dense gypsum layer has a higher density than the board core.

* * * * *